United States Patent
Le et al.

(10) Patent No.: US 11,670,329 B1
(45) Date of Patent: Jun. 6, 2023

(54) TWO-DIMENSIONAL MAGNETIC RECORDING (TDMR) TO COUNTER TAPE DIMENSIONAL STABILITY (TDS) ERRORS IN A TAPE MEDIA

(71) Applicant: Western Digital Technologies, Inc., San Jose, CA (US)

(72) Inventors: Quang Le, San Jose, CA (US); Xiaoyong Liu, San Jose, CA (US); Hongquan Jiang, San Jose, CA (US); Cherngye Hwang, San Jose, CA (US); Kuok San Ho, Emerald Hills, CA (US); Hisashi Takano, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/552,072

(22) Filed: Dec. 15, 2021

(51) Int. Cl.
   *G11B 5/48* (2006.01)
   *G11B 5/008* (2006.01)

(52) U.S. Cl.
   CPC ........ *G11B 5/4893* (2013.01); *G11B 5/00813* (2013.01)

(58) Field of Classification Search
   None
   See application file for complete search history.

(56) References Cited

U.S. PATENT DOCUMENTS

| 7,738,212 B2 | 6/2010 | Saliba et al. | |
| 7,978,429 B2 * | 7/2011 | Biskeborn | G11B 5/00826 360/121 |
| 8,988,817 B1 * | 3/2015 | Cherubini | G11B 5/584 360/77.12 |
| 9,105,291 B1 * | 8/2015 | Biskeborn | G11B 5/56 |

(Continued)

FOREIGN PATENT DOCUMENTS

| CN | 103295586 B | 12/2016 |
| WO | 2014176962 A1 | 11/2014 |
| WO | 2015016835 A1 | 2/2015 |

OTHER PUBLICATIONS

Musha, Atsushi, "A Study of TDMR for Magnetic Tape Systems", Fujifilm Corporation, pp. 1-2, <http://tmrc2018.ucsd.edu/Archive/P1-15.pdf>.

(Continued)

*Primary Examiner* — William J Klimowicz
(74) *Attorney, Agent, or Firm* — Patterson + Sheridan, LLP; Steven H. VerSteeg

(57) ABSTRACT

The present disclosure is generally related to a tape drive including a tape head configured to read shingled data on a tape. The tape head comprises a first module head assembly aligned with a second module head assembly. Both the first and second module head assemblies comprises a plurality of data heads. Each data head comprises a write head, a first read head aligned with the write head, a second read head offset from the first read head in both a cross-track direction and a down-track direction, and a third read head offset from the first and/or second read heads in the cross-track and down-track directions. By utilizing three read heads within each data head, data can be read from a tape that has experienced tape dimensional stability, as at least one read head will be near a center of each data track of the tape.

21 Claims, 9 Drawing Sheets

(56) References Cited

U.S. PATENT DOCUMENTS

| | | | |
|---|---|---|---|
| 9,129,631 B1* | 9/2015 | Biskeborn | G11B 20/1202 |
| 9,190,112 B1* | 11/2015 | Bayang | G11B 15/02 |
| 9,286,926 B1 | 3/2016 | Dhanda et al. | |
| 9,373,349 B1 | 6/2016 | Erden et al. | |
| 10,818,319 B1* | 10/2020 | Miyamura | G11B 19/041 |
| 2013/0229724 A1 | 9/2013 | Childers et al. | |
| 2015/0077881 A1* | 3/2015 | Biskeborn | G11B 5/3169 |
| | | | 360/121 |
| 2020/0251139 A1* | 8/2020 | Kasada | G11B 5/70 |

OTHER PUBLICATIONS

Biskeborn, Robert G. et al., "TMR tape drive for a 15 TB cartridge", American Institute of Physics, Dec. 26, 2017, <https://aip.scitation.org/doi/10.1063/1.5007788>.

Cherubini, Giovanni et al., "Identification of MIMO transport systems in tape drives", Institute of Electrical and Electronics Engineers, Jul. 2013, <https://www.researchgate.net/publication/261270378_Identification_of_MIMO_transport_systems_in_tape_drives>.

* cited by examiner

NORMAL

CONTRACTION

EXPANSION

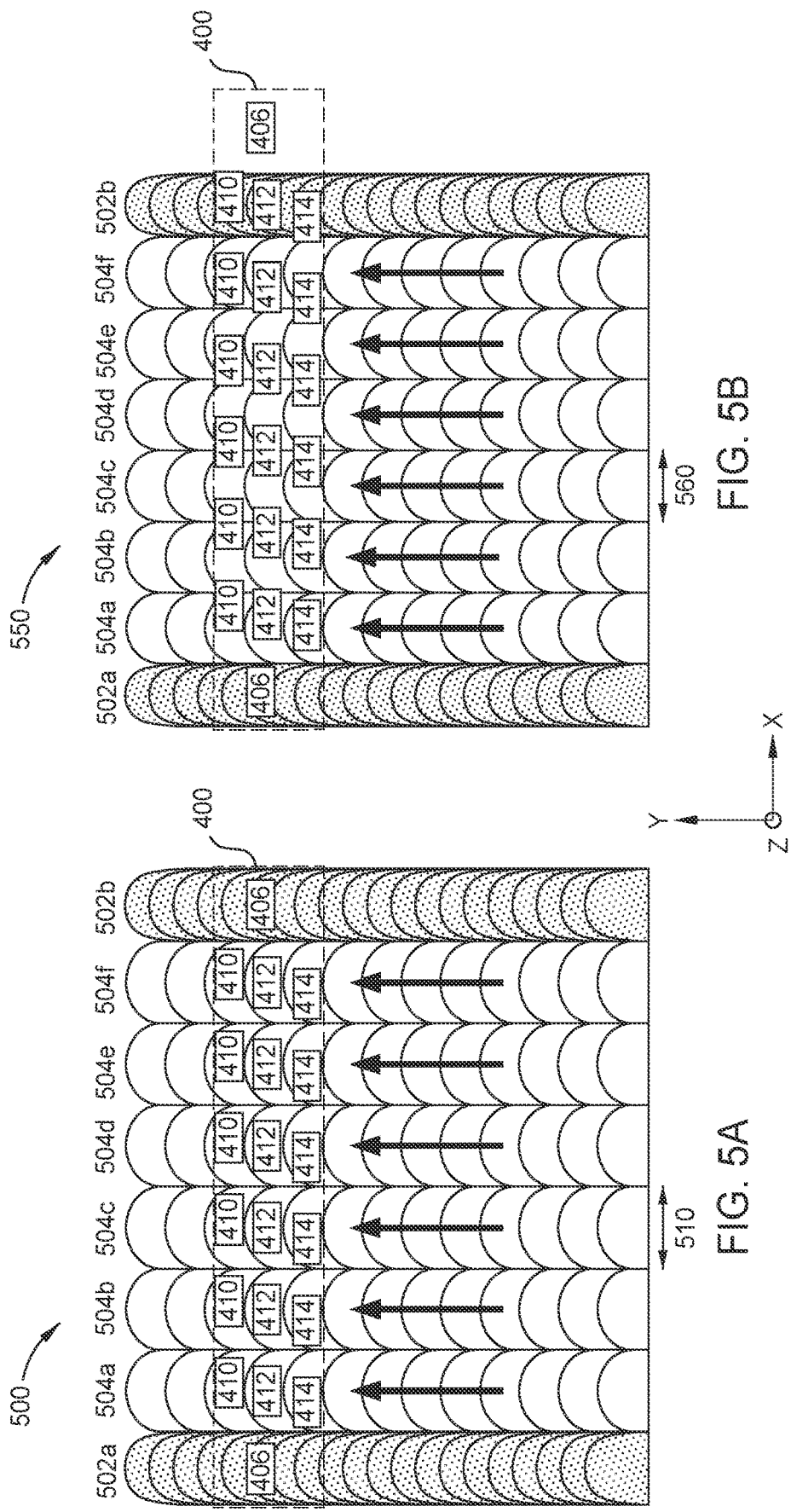

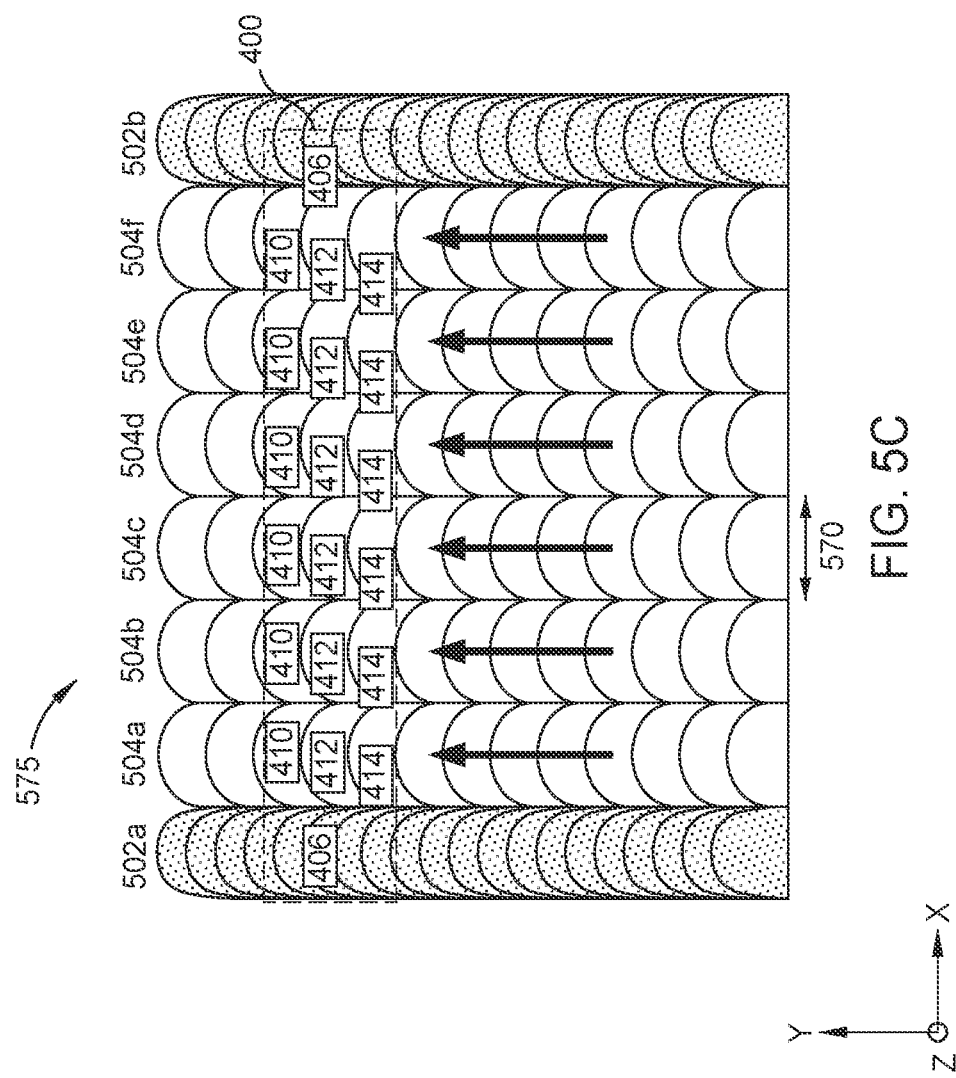

TWO-DIMENSIONAL MAGNETIC RECORDING (TDMR) TO COUNTER TAPE DIMENSIONAL STABILITY (TDS) ERRORS IN A TAPE MEDIA

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a position over the media where the data is to be stored. The magnetic write transducer then generates a magnetic field, which encodes the data into the magnetic media. Data is read from the media by similarly positioning the magnetic read transducer and then sensing the magnetic field of the magnetic media.

In a tape drive system, the quantity of data stored on a magnetic tape may be increased by increasing the number of data tracks across the tape that the tape head is capable of writing to. By overlapping portions of data tracks (e.g., shingling data tracks), improvements to data storage quantities can be achieved. However, after writing data to a tape, the tape may be exposed to various conditions, such as environmental factors, aging, temperature and humidity exposure, that cause the tape to change or become deformed, such as contracting or expanding in areas. After the tape changes, it can be difficult to read data that was written to the tape under different conditions. For example, several data tracks of the tape may have shrunk or enlarged, resulting in read heads of the tape head being misaligned with the data tracks. The misalignment of the read heads to the data track may result in a reduction of the read head signals or in the signal-to-noise ratio. As such, the tape head may be more prone to read error.

Therefore, there is a need in the art for an improved tape head able to read data from a tape that has undergone changes after writing data to the tape.

SUMMARY OF THE DISCLOSURE

The present disclosure is generally related to a tape drive including a tape head configured to read shingled data on a tape. The tape head comprises a first module head assembly aligned with a second module head assembly. Both the first and second module head assemblies comprises a plurality of data heads. Each data head comprises a write head, a first read head aligned with the write head, a second read head offset from the first read head in both a cross-track direction and a down-track direction, and third read head offset from the first and/or second read heads in the cross-track and down-track directions. By utilizing three read heads within each data head, data can be read from a tape that has experience tape dimensional stability, as at least one read head will be near a center of each data track of the tape.

In one embodiment, a tape head comprises one or more module head assemblies, each module head assembly comprising: one or more servo heads, and a plurality of data heads, each data head comprising: a write head, a first read head aligned with the write head, a second read head, the second read head being offset in a cross-track direction and in a down-track direction from the first read head and the write head, and a third read head, the third read head being offset in the cross-track direction and in the down-track direction from the first read head and the write head.

In another embodiment, a tape head comprises one or more module head assemblies, each module head assembly comprising: one or more first servo heads, and a plurality of first data heads, each first data head comprising: a first write head, a first read head aligned with the first write head in a cross-track direction, a second read head, the second read head being offset in the cross-track direction and in a down-track direction from the first read head and the first write head, and a third read head, the third read head offset from the second read head in at least the cross-track direction. The tape head further comprises a second module head assembly aligned with the first module head assembly, the second module head assembly comprising: one or more second servo heads, and a plurality of second data heads, each second data head comprising: a second write head, a fourth read head aligned with the second write head in the cross-track direction, a fifth read head, the fifth read head being offset in the cross-track direction and in the down-track direction from the fourth read head and the second write head, and a sixth read head, the sixth read head offset from the fifth read head in at least the cross-track direction.

In yet another embodiment, a tape head comprises a first module head assembly comprising: one or more servo heads, and a plurality of data heads, each data head comprising: a write head, a first read head aligned with the write head in the cross-track direction, a second read head, the second read head being offset a first distance in the cross-track direction and a second distance in a down-track direction from the first read head and the write head, and a third read head, the third read head being offset in a third distance in the cross-track direction and a fourth distance in the down-track direction from the second head.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5C illustrate the tape head of FIG. 4A reading data from various tapes, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a tape drive including a tape head configured to read shingled data on a tape. The tape head comprises a first module head assembly aligned with a second module head assembly. Both the first and second module head assemblies comprises a plurality of data heads. Each data head comprises a write head, a first read head aligned with the write head, a second read head offset from the first read head in both a cross-track direction and a down-track direction, and third read head offset from the first and/or second read heads in the cross-track and down-track directions. By utilizing three read heads within each data head, data can be read from a tape that has experience tape dimensional stability, as at least one read head will be near a center of each data track of the tape.

Figure 1A:
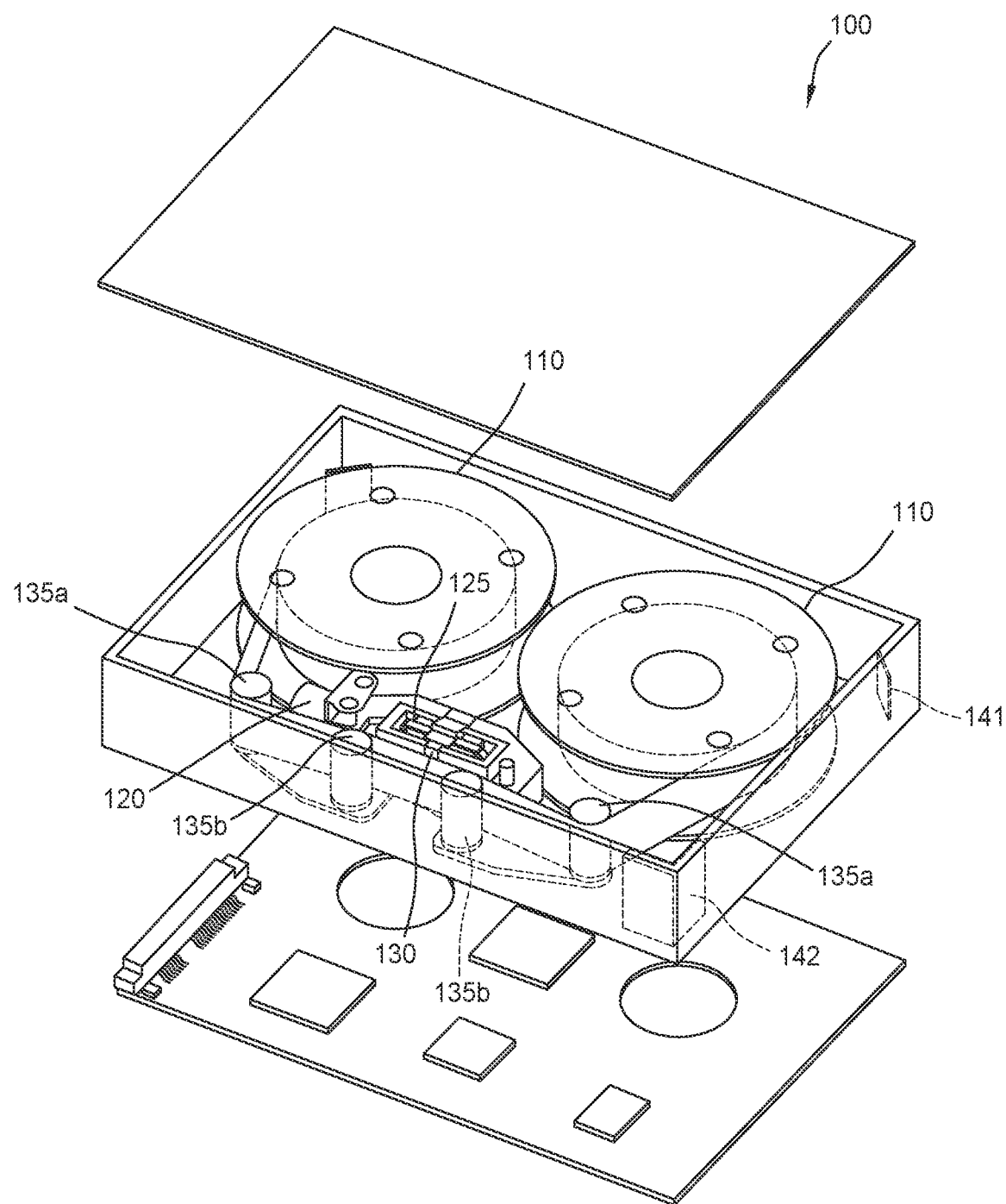
FIGS. 1A-1C illustrate a perspective exploded view, a simplified top down, and side profile view of a tape drive, in accordance with some embodiments.
Figure 1B:
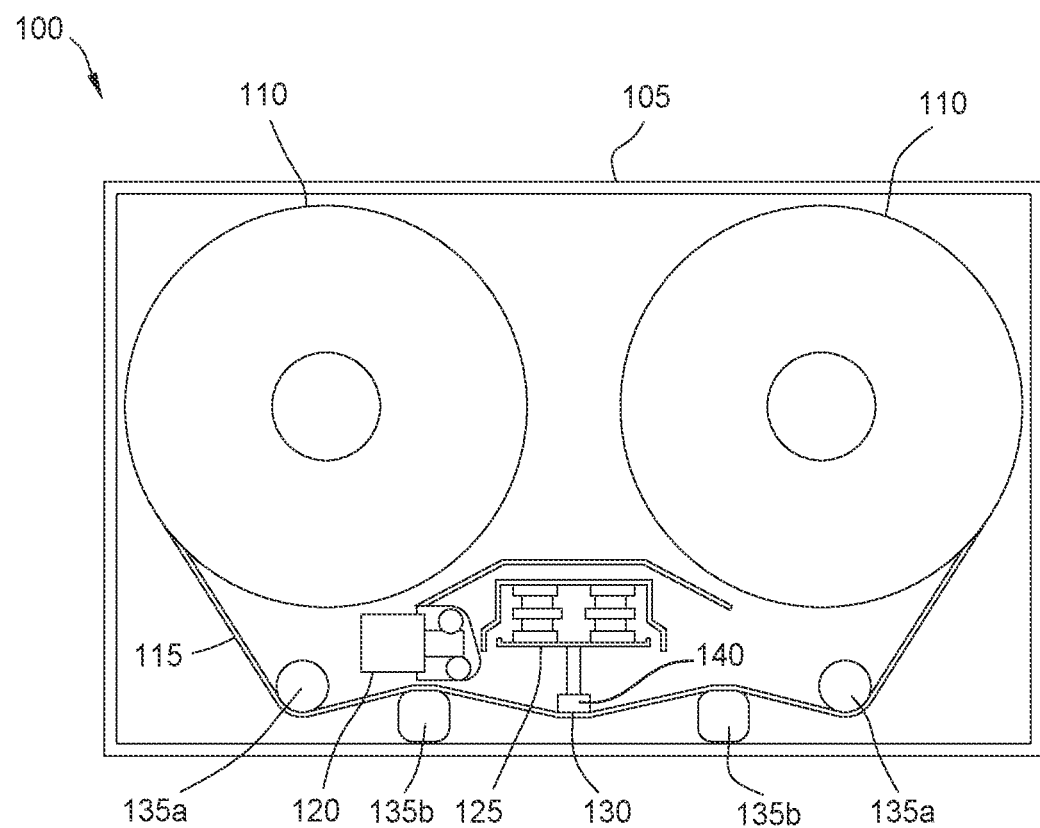
Figure 1C:
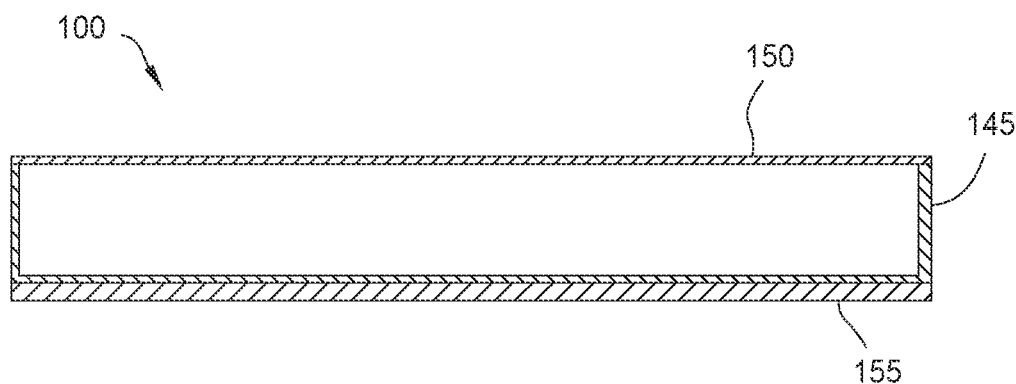

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 2:
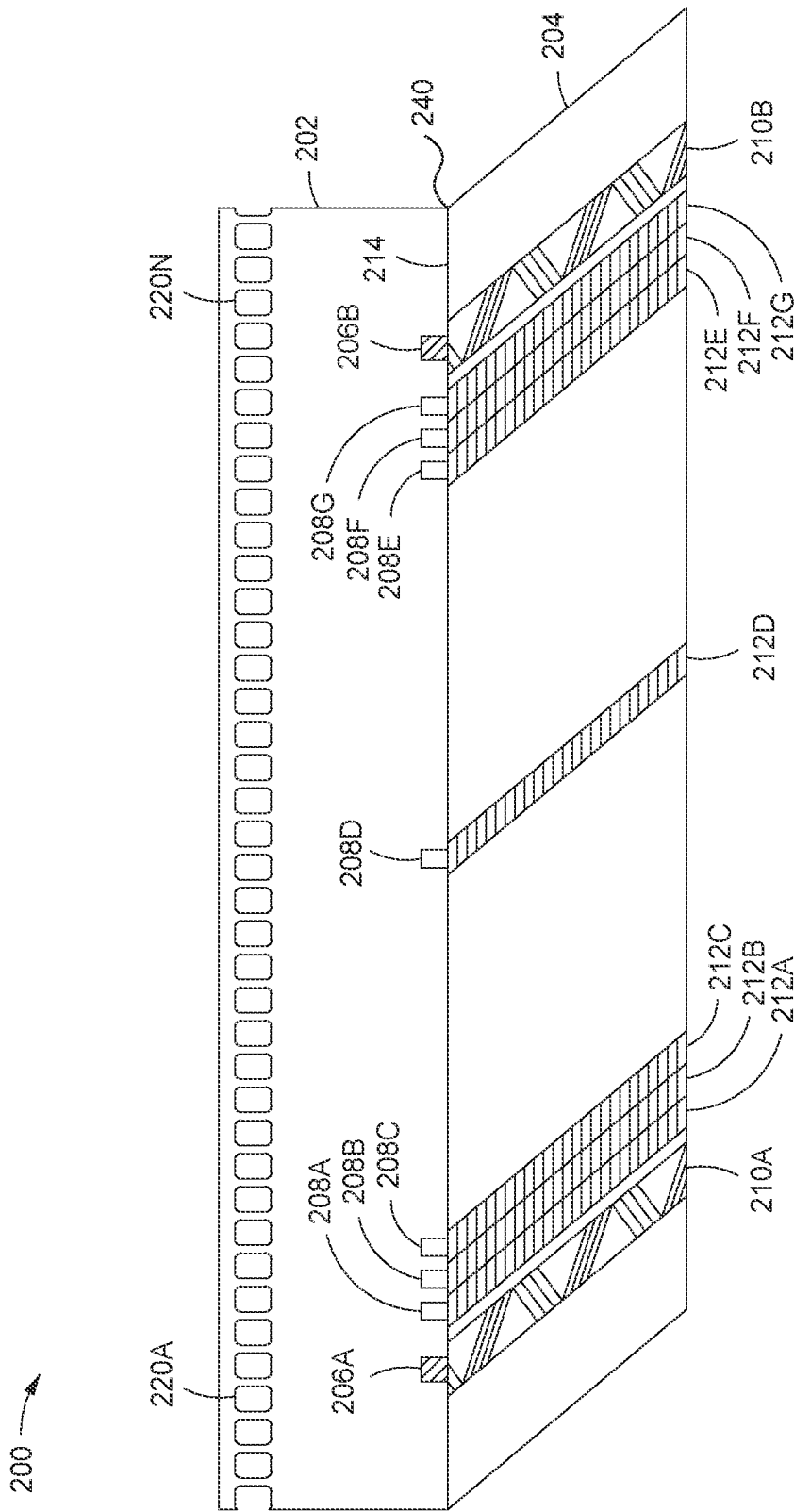
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
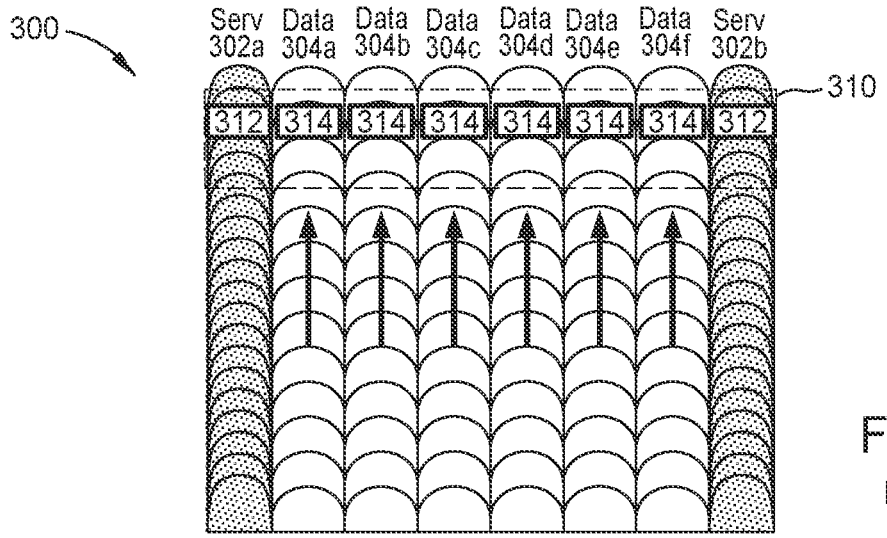
FIG. 3A illustrates a tape that has not experienced tape dimensional stability (TDS) issues, according to one embodiment.
Figure 3B:
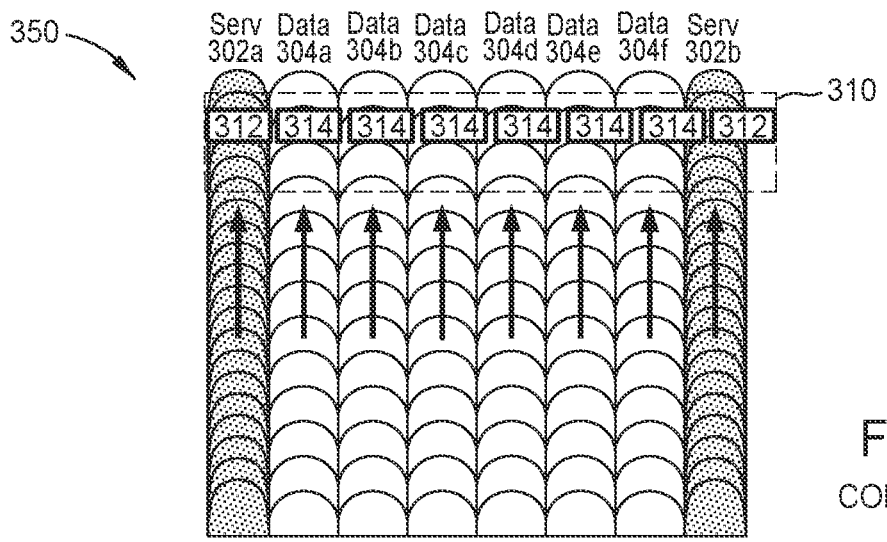
FIG. 3B illustrates a tape that has contracted due to TDS, according to another embodiment.
Figure 3C:
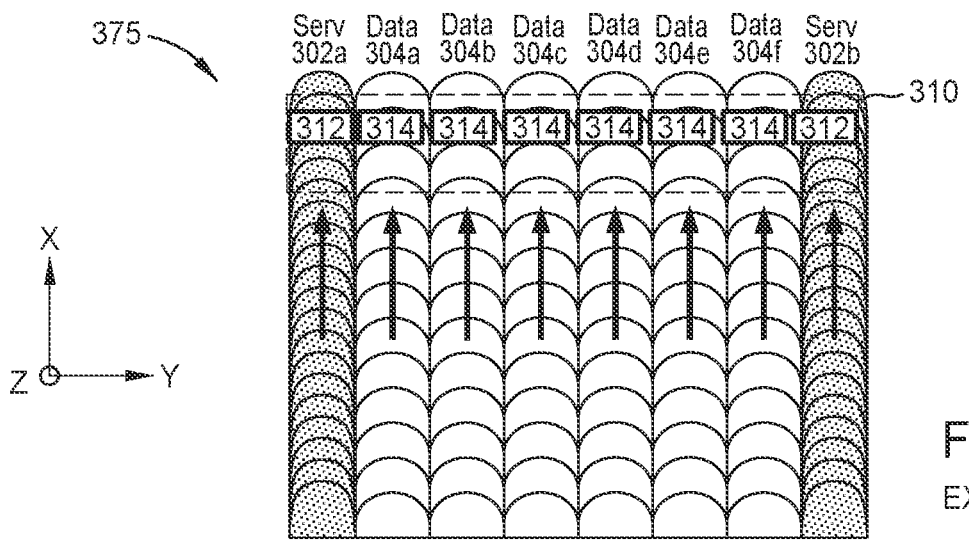
FIG. 3C illustrates a tape that has expanded due to TDS, according to yet another embodiment.

FIG. 3A illustrates a tape 300 that has not experienced tape dimensional stability (TDS) issues, according to one embodiment. FIG. 3B illustrates a tape 350 that has contracted due to TDS, according to another embodiment. FIG. 3C illustrates a tape 375 that has expanded due to TDS, according to yet another embodiment. Each tape 300, 350, 375 may be the same tape at different periods of time, or may be different portions of the same tape. Each tape 300, 350, 375 comprises shingled data (e.g., a data track 304a is first written, and then a portion of the data track 304a is over-written when the adjacent data track 304b is written).

Each tape 300, 350, 375 comprises two servo tracks 302a, 302b and a plurality of data tracks 304a-304f disposed therebetween. The number of servo tracks 302a, 302b and the number of data tracks 304a-304f are not intended to be limiting. FIGS. 3A-3C further illustrate a tape head 310 disposed over each of the tapes 300, 350, 375. The tape head 310 comprises two servo heads 312 and a plurality of data heads 314. The number of servo heads 312 and the number of data heads 314 are not intended to be limiting. Each data head 314 comprises at least one write head (not shown) for writing data to the data tracks 304a-304f and at least one read head (not shown) for reading data from the data tracks 304a-304f. The servo heads 312 are configured to read servo data from the servo tracks 302a, 302b in order to accurately position the data heads 314 on the data tracks 304a-304f.

As shown in FIG. 3A, the tape 300 has not experienced any TDS effects, and as such, each of the data heads 314 of the tape head 310 is accurately positioned on or aligned with a center of a data track 304a-304f, and the servo heads 312 are accurately positioned on or aligned with the servo tracks 302a, 302b. Thus, the data heads 314 are able to read data from the data tracks 304a-304f correctly and precisely.

In FIG. 3B, the tape 350 has contracted due to TDS effects such that the tape 350 has a smaller width in the y-direction than the tape 300. Such TDS effects may be caused due to various factors or conditions, such as environmental factors, aging of the tape 350, temperature and/or humidity conditions during writing and/or reading data, among others. Because the tape 350 has contracted, the data heads 314 are no longer accurately positioned above the data tracks 304a-304f. For example, while a data head 314 is accurately disposed over a center of a first data track 304a, the remaining data heads 314 are offset and misaligned from the center of their respective data tracks 304b-304f (e.g., the data heads 314 are skewed to the left side of their respective data tracks 304b-304f). Similarly, while the first servo head 312 is accurately disposed over a first servo track 302a, the second servo head 312 is entirely misaligned with the second servo track 302b. Due to the data heads 314 being misaligned with the data tracks 304a-304f, data previously written under different conditions may be misread or unable to be read from the data tracks 304a-304f.

In FIG. 3C, the tape 375 has expanded due to TDS effects such that the tape 375 has a larger width in the y-direction than the tape 300. Such TDS effects may be caused due to various factors or conditions, such as environmental factors, aging of the tape 375, temperature and/or humidity conditions during writing and/or reading data, among others. Because the tape 375 has expanded, the data heads 314 are no longer accurately positioned above the data tracks 304a-304f. For example, while a data head 314 is accurately disposed over a first data track 304a, the remaining data heads 314 are offset and misaligned from the center of their respective data tracks 304b-304f (e.g., the data heads 314 are skewed to the right side of their respective data tracks 304b-304f). Similarly, while the first servo head 312 is accurately disposed over a first servo track 302a, the second servo head 312 is misaligned with the second servo track 302b. Similar to the contracted tape 350, due to the data heads 314 being misaligned with the data tracks 304a-304f, data previously written under different conditions may be misread or unable to be read from the data tracks 304a-304f.

Figure 4A:
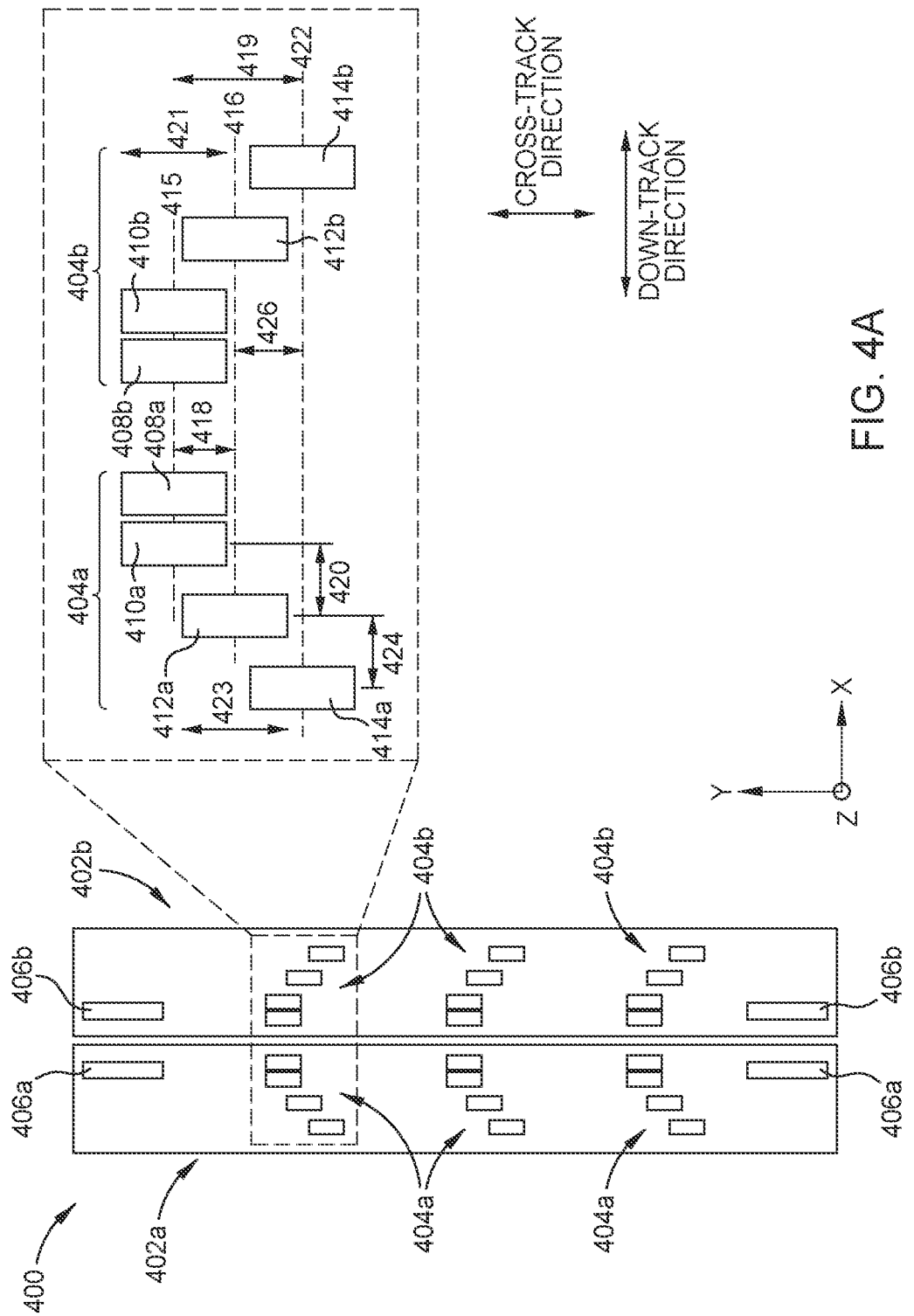
FIGS. 4A-4C illustrate tape heads that are able to counter TDS errors, according to various embodiments.
Figure 4B:
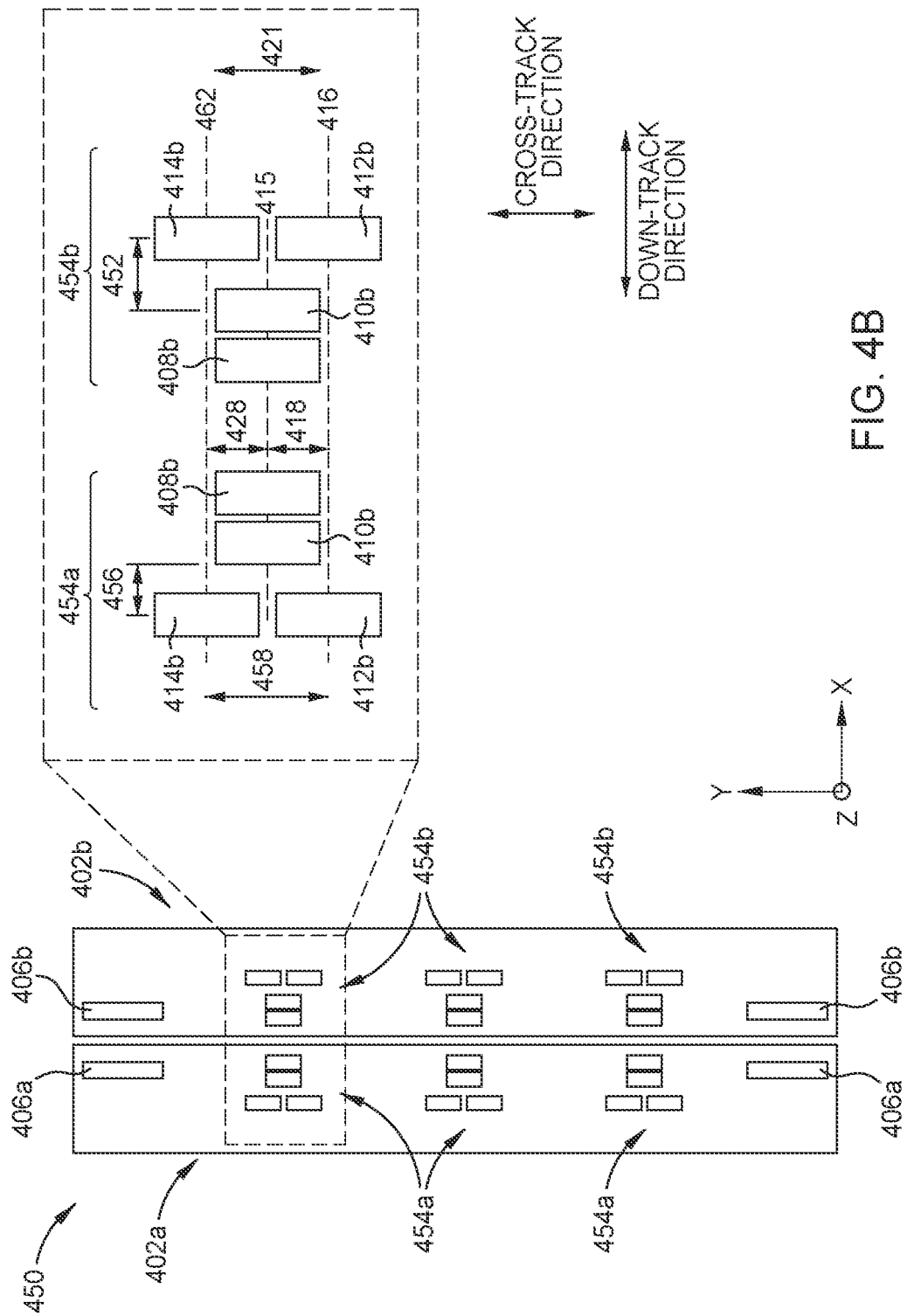
Figure 4C:
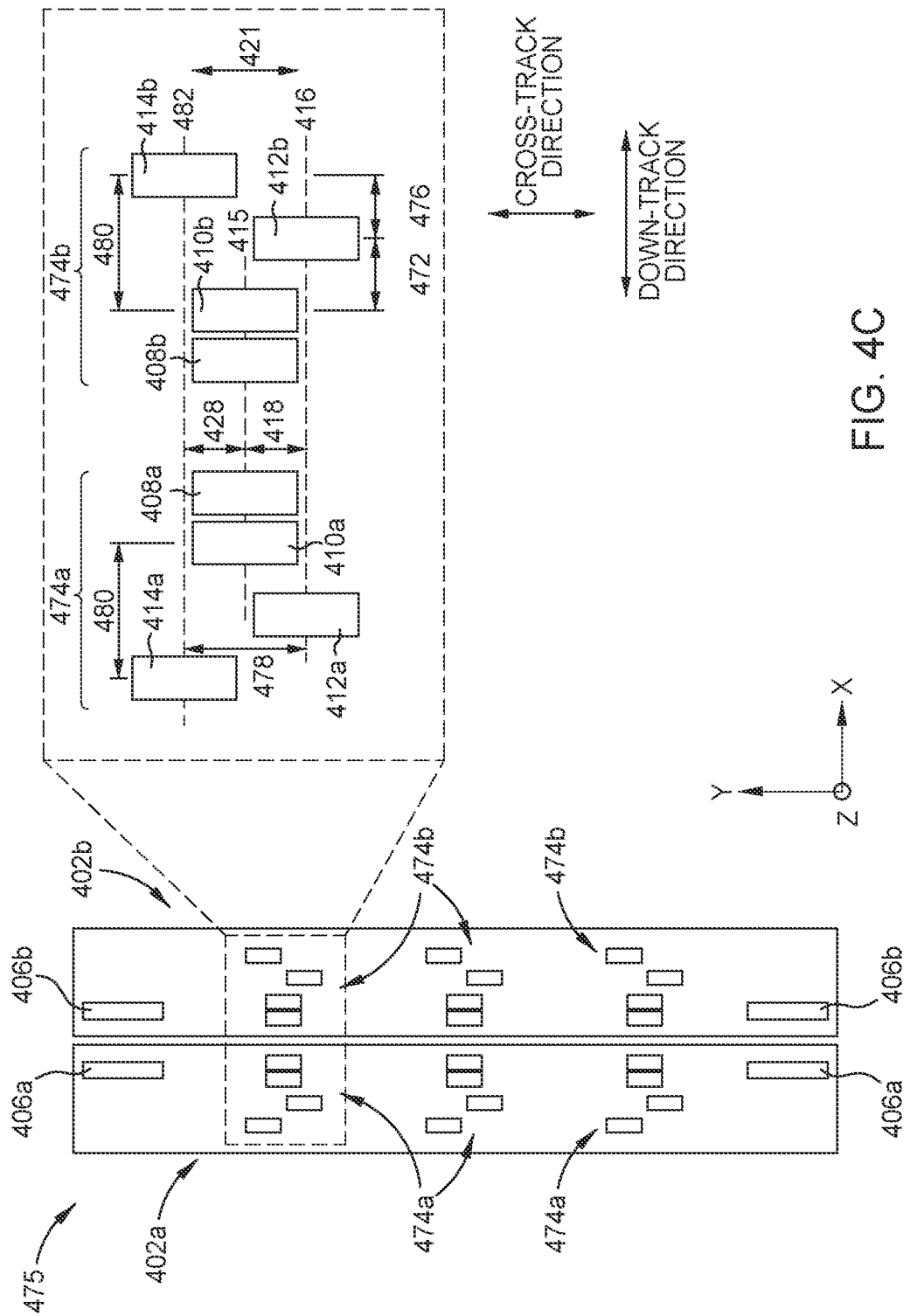

FIGS. 4A-4C illustrate tape heads 400, 450, 475, respectively, that are able to counter TDS errors, according to various embodiments. Each of the tape heads 400, 450, 475 may be within a tape drive, such as the tape drive 100 of FIG. 1. Each of the tape heads 400, 450, 475 may be the tape head module assembly 200 of FIG. 2. Each of the tape heads 400, 450, 475 are able to successfully read shingled data from tapes, such as tapes 300, 350, 375, that may or may not have been affected by TDS. Aspects of each of the tape heads 400, 450, 475 may be used in combination with one another.

The tape head 400 of FIG. 4A comprises a first head assembly 402a and a second head assembly 402b, which are mirror images of one another. The first head assembly 402a comprises a plurality of first data heads 404a and one or more first servo heads 406a. The plurality of first data heads 404a are each aligned in the y-axis. The second head assembly 402b comprises a plurality of second data heads 404b, and one or more second servo heads 406b. The plurality of second data heads 404b are each aligned in the y-axis. The first data heads 404a and the second data heads 404b may collectively be referred to as data heads 404. The first servo heads 406a and the second servo heads 406b may collectively be referred to as servo heads 406. While each head assembly 402a, 402b illustrates three data heads 404 and two servo heads 406, each head assembly 402a, 402b may comprise a greater or lesser number of both data heads 404 and servo heads 406. As such, the number of data heads 404 and the number of servo heads 406 is not intended to be limiting.

Each of the first data heads 404a comprises a write head 408a, a first read head 410a, a second read head 412a, and a third read head 414a, and each of the second data heads 404b comprises a write head 408b, a first read head 410b, a second read head 412b, and a third read head 414b. The first read head 410a and the write head 408a of each first data head 404a are aligned along a first central axis 415 (e.g., the x-axis), aligned in the cross-track direction (the y-direction) with one another, and offset in the down-track direction (the x-direction). The second read head 412a is offset in the x-direction (down-track direction) and the y-direction (cross-track direction) from the first central axis 415 of each first data head 404a. The third read head 414a is offset in the x-direction (down-track direction) and the y-direction (cross-track direction) from the second read head 412a of each first data head 404a.

Similarly, the first read head 410b and the write head 408b of each second data head 404b are aligned along the first central axis 415 (e.g., the x-axis) aligned in the cross-track direction (the y-direction) with one another, and offset in the down-track direction (the x-direction). The second read head 412b is offset in the x-direction (down-track direction) and the y-direction (cross-track direction) from the first central axis 415. The third read head 414b is offset in the x-direction (down-track direction) and the y-direction (cross-track direction) from the second read head 412b.

The write head 408a and the first read head 410a of each first data head 404a are aligned along the first central axis 415 with the write head 408b and the first read head 410b of an adjacent second data head 404b. Each write head 408a of the first head assembly 402a faces or is adjacent to a write head 408b of the second head assembly 402b. The second read head 412a of each first data head 404a is aligned along a second central axis 416 (e.g., in the x-direction) with the second read head 412b of an adjacent second data head 404b. The third read head 414a of each first data head 404a is aligned along a third central axis 422 (e.g., in the x-direction) with the third read head 414b of an adjacent second data head 404b. The first read heads 410a, 410b may collectively be referred to as first read heads 410, the second read heads 412a, 412b may collectively be referred to as second read heads 412, the third read heads 414a, 414b may collectively be referred to as third read heads 414, and the write heads 408a, 408b may collectively be referred to as write heads 408.

In some embodiments, the first servo heads 406a are aligned with the first read head 408a of each first data head 404a in the y-axis, and the second servo heads 406b are aligned with the first read head 408b of each second data head 404b in the y-axis. In other embodiments, the first servo heads 406a are aligned with the second read head 412a of each first data head 404a in the y-axis, and the second servo heads 406b are aligned with the second read head 412b of each second data head 404b in the y-axis. In another embodiment, the first servo heads 406a are aligned with the third read head 414a of each first data head 404a in the y-axis, and the second servo heads 406b are aligned with the third read head 414b of each second data head 404b in the y-axis.

Each second read head 412a, 412b is offset a first distance 418 equal to or less than half a width of a written shingled data track (e.g., half of width 510 in FIG. 5A) in the cross-track or y-direction (i.e., from the first central axis 415 to the second central axis 416) from the respective first read head 410a, 410b, depending on the desired areal density capacity. For example, the first distance 418 may be greater if a lower areal density capacity is desired, or the first distance 418 may be smaller if a higher areal density capacity is desired. The first distance 418 is less than a length 421 on the first read heads 410a, 410b in the y-direction such that the first read heads 410a, 410b and the second read heads 412a, 412b overlap, such as overlapping on one data track of a tape. Each second read head 412a, 412b is offset a second distance 420 of about 100 nm to about 500 nm in the down-track or x-direction from the respective first read head 410a, 410b, depending on the desired areal density capacity. While the second read heads 412a, 412b are shown to be offset from the first read heads 410a, 410b in the −y-direction, the second read heads 412a, 412b may each be offset in the y-direction instead.

Each third read head 414a, 414b is offset a third distance 426 equal to or less than half a width of a written shingled data track (e.g., half of width 510 in FIG. 5A) in the cross-track or y-direction (i.e., from the second central axis 416 to the third central axis 422) from the respective second read head 412a, 412b, depending on the desired areal density capacity. In other words, each third read head 414a, 414 is offset in the cross-track direction a fourth distance 419 from the first read heads 410a, 410b. The third distance 426 may be greater than a length 421 of the first read heads 410a, 410b in y-direction. The third distance 426 is less than a length 423 on the second read heads 412a, 412b in the y-direction such that the second read heads 412a, 412b and the third read heads 414a, 414b overlap, such as overlapping on one data track of a tape. Each third read head 414a, 414b is offset a fifth distance 424 of about 100 nm to about 500 nm in the down-track or x-direction from the respective second read head 412a, 412b, depending on the desired areal density capacity.

The first distance 418 and the third distance 426 may be the same or different. The second distance 420 and the fifth distance 424 may be the same or different. Because the first, second, and third read heads 410, 412, 414 overlap one another, the tape drive may be configured to use two or more read heads 410, 412, 414 simultaneously to read data from one data track to reduce the signal-to-noise ratio. While the third read heads 414a, 414b are shown to be offset from the second read head 412a, 412b in the −y-direction, the third read head 414a, 414b may each be offset in the y-direction instead. Therefore, each of the first, second, and third read heads 410, 412, 414 of each data head 404 are offset from one another in both the cross-track and down-track directions.

The tape head 450 of FIG. 4B is similar to the tape head 400 of FIG. 4A; however the first head assembly 402a of the tape head 450 comprises a plurality of first data heads 454a and the second head assembly 402b of the tape head 450 comprises a plurality of second data heads 454b. The plurality of first data heads 454a are each aligned in the y-axis, and the plurality of second data heads 454b are each aligned in the y-axis. The first data heads 454a and the second data heads 454b may collectively be referred to as data heads 454. The number of data heads 454 is not intended to be limiting.

Each of the first data heads 454a comprises a write head 408a, a first read head 410a, a second read head 412a, and a third read head 414a, and each of the second data heads 454b comprises a write head 408b, a first read head 410b, a second read head 412b, and a third read head 414b. The first read head 410a and the write head 408a of each first data head 454a are aligned along a first central axis 415 (e.g., the x-axis), aligned in the cross-track direction with one another, and offset in the down-track direction (the x-direction). The second read head 412a is offset in the x-direction (down-track direction) and the y-direction (cross-track direction) from the first central axis 415 of each first data head 454a. The third read head 414a is offset in the y-direction (cross-track direction) from the second read head 412a, but is aligned with the second read head 412a in the down-track direction or x-direction. The third read head 414a of each first data head 454a is further offset in the x-direction (down-track direction) and the y-direction (cross-track direction) from the first central axis 415.

Similarly, the first read head 410b and the write head 408b of each second data head 454b are aligned along the first central axis 415 (e.g., the x-axis) aligned in the cross-track direction with one another, and offset in the down-track direction (the x-direction). The second read head 412b is offset in the x-direction (down-track direction) and the y-direction (cross-track direction) from the first central axis 415. The third read head 414b of each second data head 454b is offset in the y-direction (cross-track direction) from the second read head 412b, but is aligned with the second read head 412b in the down-track direction or x-direction. The third read head 414b is further offset in the x-direction (down-track direction) and the y-direction (cross-track direction) from the first central axis 415.

Each write head 408a of each first head assembly 402a faces or is adjacent to a write head 408b of a second head assembly 402b. The write head 408a and the first read head 410a of each first data head 454a are aligned along the first central axis 415 with the write head 408b and the first read head 410b of an adjacent second head assembly 454b. The second read head 412a of each first data head 454a is aligned along a second central axis 416 (e.g., in the x-direction) with the second read head 412b of an adjacent second data head 454b. The third read head 414a of each first data head 454a is aligned along a third central axis 462 (e.g., in the x-direction) with the third read head 414b of an adjacent second data head 454b.

In some embodiments, the first servo heads 406a are aligned with the first read head 408a of each first data head 454a in the y-axis, and the second servo heads 406b are aligned with the first read head 408b of each second data head 454b in the y-axis. In other embodiments, the first servo heads 406a are aligned with the second and third read heads 412a, 414a of each first data head 454a in the y-axis, and the second servo heads 406b are aligned with the second and third read heads 412b, 414b of each second data head 454b in the y-axis.

Each second read head 412a, 412b is offset a first distance 418 equal to or less than half a width of a written shingled data track (e.g., half of width 510 in FIG. 5A) in the cross-track or y-direction (i.e., from the first central axis 415 to the second central axis 416) from the respective first read head 410a, 410b, depending on the desired areal density capacity. The first distance 418 is less than a length 421 on the first read heads 410a, 410b in the y-direction such that the first read heads 410a, 410b and the second read heads 412a, 412b overlap, such as overlapping on one data track of a tape. Each second read head 412a, 412b is offset a second distance 452 of about 100 nm to about 500 nm in the down-track or x-direction from the respective first read head 410a, 410b, depending on the desired areal density capacity.

Each third read head 414a, 414b is offset a third distance 428 equal to or less than half a width of a written shingled data track (e.g., half of width 510 in FIG. 5A) in the cross-track or y-direction (i.e., from the first central axis 415 to the third central axis 462) from the respective first read head 410a, 410b, depending on the desired areal density capacity. The third distance 428 is less than a length 421 on the first read heads 410a, 410b in the y-direction such that the first read heads 410a, 410b and the third read heads 414a, 414b overlap, such as overlapping on one data track of a tape. Each third read head 414a, 414b is offset a fourth distance 456 of about 100 nm to about 500 nm in the down-track or x-direction from the respective first read head 410a, 410b. Each third read head 414a, 414b is offset a fifth distance 458 equal to or less than a width of a written shingled data track (e.g., the width 510 in FIG. 5A) in the cross-track or y-direction from the respective second read head 412a, 412b, depending on the desired areal density capacity. The fifth distance 458 may be about twice the third distance 428 or twice the first distance 418. The first distance 418 and the third distance 428 may be the same or different. The second distance 452 and the fourth distance 456 may be the same or different. Because the first, second, and third read heads 410, 412, 414 overlap one another, the tape head 400 may be configured to use two or more read heads 410, 412, 414 simultaneously to read data from one data track to reduce the signal-to-noise ratio.

In the tape head 450 of FIG. 4B, the second read heads 412a, 412b are offset from the first read heads 410a, 410b in the −y-direction or a first direction, and the third read heads 414a, 414b are offset from the first read heads 410a, 410b in the y-direction or a second direction opposite the first direction. While the second read heads 412a, 412b are shown to be offset from the first read heads 410a, 410b in the −y-direction, the second read heads 412a, 412b may each be offset in the y-direction instead, and while the third read heads 414a, 414b are shown to be offset from the second read head 412a, 412b in the y-direction, the third read head 414a, 414b may each be offset in the −y-direction instead. Therefore, each of the first, second, and third read heads 410, 412, 414 of each data head 454 are offset from one another in at least the cross-track direction.

The tape head 475 of FIG. 4C is similar to the tape head 400 of FIG. 4A and the tape head 450 of FIG. 4B; however the first head assembly 402a of the tape head 475 comprises a plurality of first data heads 474a and the second head assembly 402b of the tape head 475 comprises a plurality of second data heads 474b. The plurality of first data heads 474a are each aligned in the y-axis, and the plurality of second data heads 474b are each aligned in the y-axis. The first data heads 474a and the second data heads 474b may collectively be referred to as data heads 474. The number of data heads 474 is not intended to be limiting.

Each of the first data heads 474a comprises a write head 408a, a first read head 410a, a second read head 412a, and a third read head 414a, and each of the second data heads 474b comprises a write head 408b, a first read head 410b, a second read head 412b, and a third read head 414b. The first read head 410a and the write head 408a of each first data head 404a are aligned along a first central axis 415 (e.g., the x-axis), aligned in the cross-track direction with one another, and offset in the down-track direction (the x-direction). The second read head 412a is offset in the x-direction (down-track direction) and the y-direction (cross-track direction) from the first central axis 415 of each first data head 474a. The third read head 414a of each first data head 474a is offset in the x-direction (down-track direction) and the y-direction (cross-track direction) from the second read head 412a and from the first central axis 415.

Similarly, the first read head 410b and the write head 408b of each second data head 404b are aligned along the first central axis 415 (e.g., the x-axis) aligned in the cross-track direction with one another, and offset in the down-track direction (the x-direction). The second read head 412b is offset in the x-direction (down-track direction) and the y-direction (cross-track direction) from the first central axis 415. The third read head 414b of each second data head 474b is offset in the x-direction (down-track direction) and the y-direction (cross-track direction) from the second read head 412b and from the first central axis 415.

The write head 408a and the first read head 410a of each first data head 474a are aligned along the first central axis 415 with the write head 408b and the first read head 410b of an adjacent second data head 474b. Each write head 408a of the first head assembly 402a faces or is adjacent to a write head 408b of the second head assembly 402b. The second read head 412a of each first data head 474a is aligned along a second central axis 416 (e.g., in the x-direction) with the second read head 412b of an adjacent second data head 474b. The third read head 414a of each first data head 474a is aligned along a third central axis 482 (e.g., in the x-direction) with the third read head 414b of an adjacent second data head 474b.

In some embodiments, the first servo heads 406a are aligned with the first read head 408a of each first data head 474a in the y-axis, and the second servo heads 406b are aligned with the first read head 408b of each second data head 474b in the y-axis. In other embodiments, the first servo heads 406a are aligned with the second read head 412a of each first data head 474a in the y-axis, and the second servo heads 406b are aligned with the second read head 412b of each second data head 474b in the y-axis. In another embodiment, the first servo heads 406a are aligned with the third read head 414a of each first data head 474a in the y-axis, and the second servo heads 406b are aligned with the third read head 414b of each second data head 474b in the y-axis.

Each second read head 412a, 412b is offset a first distance 418 equal to or less than half a width of a written shingled data track (e.g., half of width 510 in FIG. 5A) in the cross-track or y-direction (i.e., from the first central axis 415 to the second central axis 416) from the respective first read head 410a, 410b, depending on the desired areal density capacity. The first distance 418 is less than a length 421 on the first read heads 410a, 410b in the y-direction such that the first read heads 410a, 410b and the second read heads 412a, 412b overlap, such as overlapping on one data track of a tape. Each second read head 412a, 412b is offset a second distance 472 of about 100 nm to about 500 nm in the down-track or x-direction from the respective first read head 410a, 410b.

Each third read head 414a, 414b is offset a third distance 428 equal to or less than half a width of a written shingled data track (e.g., half of width 510 in FIG. 5A) in the cross-track or y-direction (i.e., from the first central axis 415 to the third central axis 482) from the respective first read head 410a, 410b, depending on the desired areal density capacity. The third distance 428 is less than a length 421 on the first read heads 410a, 410b in the y-direction such that the first read heads 410a, 410b and the third read heads 414a, 414b overlap, such as overlapping on one data track of a tape. Each third read head 414a, 414b is offset a fourth distance 476 of about 100 nm to about 500 nm in the down-track or x-direction from the respective second read head 412a, 412b, depending on the desired areal density capacity. Additionally, each third read head 414a, 414b is offset a fifth distance 478 equal to or less than a width of a written shingled data track (e.g., the width 510 in FIG. 5A) in the cross-track or y-direction from the respective second read head 412a, 412b, depending on the desired areal density capacity. The fifth distance 478 may be about twice the third distance 428 or twice the first distance 418. Each third read head 414a, 414b is further offset a sixth distance 480 of about 200 nm to about 1000 nm in the down-track or x-direction from the respective first read head 410a, 410b, depending on the desired areal density capacity. The sixth distance 480 is greater than the second distance 472. The first distance 418 and the third distance 428 may be the same or different. The second distance 472 and the fourth distance 476 may be the same or different. Because the first, second, and third read heads 410, 412, 414 overlap one another, the tape head 400 may be configured to use two or more read heads 410, 412, 414 simultaneously to read data from one data track to reduce the signal-to-noise ratio.

In the tape head 475 of FIG. 4C, the second read heads 412a, 414b are offset from the first read heads 410a, 410b in the –y-direction or a first direction, and the third read heads 414a, 414b are offset from the first read heads 410a, 410b in the y-direction or a second direction opposite the first direction. While the second read heads 412a, 412b are shown to be offset from the first read heads 410a, 410b in the –y-direction, the second read heads 412a, 412b may each be offset in the y-direction instead, and while the third read heads 414a, 414b are shown to be offset from the second read head 412a, 412b in the y-direction, the third read head 414a, 414b may each be offset in the –y-direction instead. Therefore, each of the first, second, and third read heads 410, 412, 414 of each data head 474 are offset from one another in both the cross-track and down-track directions.

As noted above, aspects of each of the tape heads 400, 450, 475 may be used in combination with one another. For example, each data head 404a, 404b of the tape head 400 may comprise additional read heads 410, 412, 414, such as additional read heads positioned similar to the third read head 414a, 414b of the tape head 450, and/or additional read heads positioned similar to the third read head 414a, 414b of the tape head 475. As such, the tape heads 400, 450, 475 are not limited to comprising only three read heads.

By including three read heads 410, 412, 414 in one data head 404, 454, 474 of a tape head, at least one read head 410, 412, 414 will be positioned near the center of a data track when reading data from a tape, regarding of whether any TDS effects have occurred since the data was written, as discussed further below in FIGS. 5A-5C.

FIGS. 5A-5C illustrate the tape head 400 of FIG. 4A reading data from various tapes 500, 550, 575, according to various embodiments. While the tape head 400 of FIG. 4A is used in the example of FIGS. 5A-5C, the tape head 450 of FIG. 4B and the tape head 475 of FIG. 4C would function similarly. Each tape 500, 550, 575 may be the same tape at different periods of time, or may be different portions of the same tape. Each tape 500, 550, 575 comprises shingled data (e.g., a data track 504a is first written, and then a portion of the data track 504a is overwritten when the adjacent data track 504b is written).

FIG. 5A illustrates a tape 500 that has not experienced any TDS effects since writing the data to the data tracks 504a-504f. The tape head 400 uses the servo heads 406 to read servo data from the servo tracks 502a, 502b to measure speed and position in order to align the tape head 400 accurately. Upon aligning the tape head 400, the tape head 400 and/or tape drive may determine that the second read head 412 of each data head 404 is positioned nearest to the center of the data tracks 504a-504f, and thus, may utilize at least the second read head 412 to read the data from the tape 500. In some embodiments, the tape drive may be configured to use two or more read heads 410, 412, 414 simultaneously to read data from each data track 504a-504f to increase the signal-to-noise ratio.

FIG. 5B illustrates a tape 550 that has contracted due to TDS effects since writing the data to the data tracks 504a-504f. The tape head 400 uses at least one servo head 506 to read servo data from the servo tracks 502a, 502b to measure speed and position in order to align the tape head 400 accurately. Upon aligning the tape head 400, the tape head 400 and/or tape drive may determine that the first read heads 410 are positioned nearest to the center of data tracks 504e and 504f, the second read heads 412 are positioned nearest to the center of the data track 504a, and the third read heads 414 are positioned nearest to the center of data tracks 504b-504d. Thus, the tape head 400 and/or tape drive may utilize a combination of the first, second, and third read heads 410, 412, 414 to read the data from the contracted tape 550. In some embodiments, the tape drive may be configured to use two or more read heads 410, 412, 414 simultaneously to read data from each data track 504a-504f to increase the signal-to-noise ratio.

FIG. 5C illustrates a tape 575 that has expanded due to TDS effects since writing the data to the data tracks 504a-504f. The tape head 400 uses at least one servo head 506 to read servo data from the servo tracks 502a, 502b to measure speed and position in order to align the tape head 400 accurately. Upon aligning the tape head 400, the tape head 400 and/or tape drive may determine that the first read heads 410 are positioned nearest to the center of data tracks 504a, 504d, and 504f, the second read heads 412 are positioned nearest to the center of the data tracks 504b and 504c, and the third read heads 414 are positioned nearest to the center of data tracks 504e and 504f. Thus, the tape head 400 and/or tape drive may utilize a combination of the first, second, and third read heads 410, 412, 414 to read the data from the expanded tape 575. In some embodiments, the tape drive may be configured to use two or more read heads 410, 412, 414 simultaneously to read data from each data track 504a-504f to increase the signal-to-noise ratio.

Because the read heads of a data head are offset in the cross-track and/or down-track directions from one another, at least one read head will be positioned nearest to the center of each data track when reading data from a tape that has experience TDS effects since writing data. As such, data may be read from a tape regardless of the condition of the tape, such as the tape expanding or contracting. Moreover, two or more of the three read heads of each data head may simultaneously read data from one data track to reduce the signal-to-noise ratio, resulting in a more reliable read of the data.

In one embodiment, a tape head comprises one or more module head assemblies, each module head assembly comprising: one or more servo heads, and a plurality of data heads, each data head comprising: a write head, a first read head aligned with the write head, a second read head, the second read head being offset in a cross-track direction and in a down-track direction from the first read head and the write head, and a third read head, the third read head being offset in the cross-track direction and in the down-track direction from the first read head and the write head.

The third read head is further offset in the cross-track direction and in the down-track direction from the second read head. The second read head is offset from the first read head a first direction in the down-track direction, and the third read head is offset from the first read head a second direction opposite the first read head in the down-track direction. The second read head is offset in the cross-track direction from the first read head a distance equal to or less than half a width of a written shingled data track of a tape, and wherein the second read head is offset in the down-track direction from the first read head a distance of about 100 nm to about 500 nm. The third read head is offset in the cross-track direction from the first read head a distance equal to or less than a width of a written shingled data track of a tape, and wherein the third read head is offset in the down-track direction from the first read head a distance of about 100 nm to about 1000 nm. Two or more of the first, second, and third read heads are configured to read shingled data from a tape simultaneously. A tape drive comprises the tape head.

In another embodiment, a tape head comprises a first module head assembly comprising: one or more first servo heads, and a plurality of first data heads, each first data head comprising: a first write head, a first read head aligned with the first write head in a cross-track direction, a second read head, the second read head being offset in the cross-track direction and in a down-track direction from the first read head and the first write head, and a third read head, the third read head offset from the second read head in at least the cross-track direction. The tape head further comprises a second module head assembly aligned with the first module head assembly, the second module head assembly comprising: one or more second servo heads, and a plurality of second data heads, each second data head comprising: a second write head, a fourth read head aligned with the second write head in the cross-track direction, a fifth read head, the fifth read head being offset in the cross-track direction and in the down-track direction from the fourth read head and the second write head, and a sixth read head, the sixth read head offset from the fifth read head in at least the cross-track direction.

Each of the plurality of first data heads of the first module head assembly are aligned with a second data head of the plurality of second data heads of the second module head assembly. The third read head is further offset in the down-track direction from the second read head. The sixth read head is further offset in the down-track direction from the fifth read head. The third read head is further offset in the cross-track direction and the down-track direction from the first read head. The sixth read head is further offset in the cross-track direction and the down-track direction from the fourth read head. The second read head and the third read head are aligned in the down-track direction. The fifth read head and the sixth read head are aligned in the down-track direction. The tape head is configured to read data from a tape that has experienced tape dimensional stability effects. Two or more of the first, second, and third read heads are configured to read shingled data from a tape simultaneously. Two or more of the fourth, fifth, and sixth read heads are configured to read shingled data from a tape simultaneously. A tape drive comprises the tape head.

In yet another embodiment, a tape head comprises one or more module head assemblies, each module head assembly comprising: one or more servo heads, and a plurality of data heads, each data head comprising: a write head, a first read head aligned with the write head in the cross-track direction, a second read head, the second read head being offset a first distance in the cross-track direction and a second distance in a down-track direction from the first read head and the write head, and a third read head, the third read head being offset in a third distance in the cross-track direction and a fourth distance in the down-track direction from the second head.

The first distance is about equal to the third distance, and wherein the second distance is about equal to the fourth distance. The third read head is offset in a fifth distance in the cross-track direction and a sixth distance in the down-track direction from the first head. The fifth distance is about equal to the first distance. The fifth distance is greater than the first distance. The sixth distance is greater than the second distance. The tape head is configured to read data from a tape that has experienced tape dimensional stability effects using one or more of the first, second, and third read heads. A tape drive comprises the tape head.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
   one or more module head assemblies, each module head assembly comprising:
     one or more servo heads; and
     a plurality of data heads, each data head comprising:
       a write head;
       a first read head aligned with the write head;
       a second read head, the second read head being offset in a cross-track direction and in a down-track direction from the first read head and the write head; and
       a third read head, the third read head being offset in the cross-track direction and in the down-track direction from the first read head and the write head.

2. The tape head of claim 1, wherein the third read head is further offset in the cross-track direction and in the down-track direction from the second read head.

3. The tape head of claim 1, wherein the second read head is offset from the first read head in a first direction in the down-track direction, and the third read head is offset from the first read head in a second direction in the down-track direction, the first and second directions being opposite to each other in the cross-track direction.

4. The tape head of claim 1, wherein the second read head is offset in the cross-track direction from the first read head a distance equal to or less than half a width of a written shingled data track of a tape, and wherein the second read head is offset in the down-track direction from the first read head a distance of about 100 nm to about 500 nm.

5. The tape head of claim 1, wherein the third read head is offset in the cross-track direction from the first read head a distance equal to or less than a width of a written shingled data track of a tape, and wherein the third read head is offset in the down-track direction from the first read head a distance of about 100 nm to about 1000 nm.

6. The tape head of claim 1, wherein two or more of the first, second, and third read heads are configured to read shingled data from a tape simultaneously.

7. A tape drive comprising the tape head of claim 1.

8. A tape head, comprising:
a first module head assembly, comprising:
one or more first servo heads; and
a plurality of first data heads, each first data head comprising:
a first write head;
a first read head aligned with the first write head in a cross-track direction;
a second read head, the second read head being offset in the cross-track direction and in a down-track direction from the first read head and the first write head; and
a third read head, the third read head offset from the second read head in at least the cross-track direction; and
a second module head assembly aligned with the first module head assembly, the second module head assembly comprising:
one or more second servo heads; and
a plurality of second data heads, each second data head comprising:
a second write head;
a fourth read head aligned with the second write head in the cross-track direction;
a fifth read head, the fifth read head being offset in the cross-track direction and in the down-track direction from the fourth read head and the second write head; and
a sixth read head, the sixth read head offset from the fifth read head in at least the cross-track direction.

9. The tape head of claim 8, wherein each of the plurality of first data heads of the first module head assembly are aligned with a second data head of the plurality of second data heads of the second module head assembly.

10. The tape head of claim 8, wherein the third read head is further offset in the down-track direction from the second read head, and wherein the sixth read head is further offset in the down-track direction from the fifth read head.

11. The tape head of claim 8, wherein the third read head is further offset in the cross-track direction and the down-track direction from the first read head, and wherein the sixth read head is further offset in the cross-track direction and the down-track direction from the fourth read head.

12. The tape head of claim 8, wherein the second read head and the third read head are aligned in the down-track direction, and wherein the fifth read head and the sixth read head are aligned in the down-track direction.

13. A tape drive comprising the tape head of claim 8.

14. The tape drive of claim 13, wherein the tape head is configured to read data from a tape that has experienced tape dimensional stability effects, wherein two or more of the first, second, and third read heads are configured to read shingled data from a tape simultaneously, and wherein two or more of the fourth, fifth, and sixth read heads are configured to read shingled data from a tape simultaneously.

15. A tape head, comprising:
one or more module head assemblies, each module head assembly comprising:
one or more servo heads; and
a plurality of data heads, each data head comprising:
a write head;
a first read head aligned with the write head in a cross-track direction;
a second read head, the second read head being offset a first distance in the cross-track direction and a second distance in a down-track direction from the first read head and the write head; and
a third read head, the third read head being offset in a third distance in the cross-track direction and a fourth distance in the down-track direction from the second read head.

16. The tape head of claim 15, wherein the first distance is about equal to the third distance, and wherein the second distance is about equal to the fourth distance.

17. The tape head of claim 15, wherein the third read head is offset in a fifth distance in the cross-track direction and a sixth distance in the down-track direction from the first read head.

18. The tape head of claim 17, wherein the fifth distance is about equal to the first distance.

19. The tape head of claim 17, wherein the fifth distance is greater than the first distance, and wherein the sixth distance is greater than the second distance.

20. A tape drive comprising the tape head of claim 15.

21. The tape drive of claim 20, wherein the tape head is configured to read data from a tape that has experienced tape dimensional stability effects using one or more of the first, second, and third read heads.

* * * * *